(12) United States Patent
Jack et al.

(10) Patent No.: US 12,460,989 B2
(45) Date of Patent: Nov. 4, 2025

(54) NON-DESTRUCTIVE SCANNING DEVICE FOR AIRFOIL-SHAPED BODIES

(71) Applicant: Verifi Technologies, LLC, Waco, TX (US)

(72) Inventors: David A. Jack, Waco, TX (US); Benjamin M. Blandford, Waco, TX (US); Gary Georgeson, Tacoma, WA (US)

(73) Assignee: Baylor University, Waco, TX (US)

( * ) Notice: Subject to any disclaimer, the term of this patent is extended or adjusted under 35 U.S.C. 154(b) by 375 days.

(21) Appl. No.: 18/208,595

(22) Filed: Jun. 12, 2023

(65) Prior Publication Data
US 2023/0400377 A1    Dec. 14, 2023

Related U.S. Application Data

(60) Provisional application No. 63/351,626, filed on Jun. 13, 2022.

(51) Int. Cl.
*G01M 5/00* (2006.01)
*B64C 27/00* (2006.01)

(52) U.S. Cl.
CPC ......... *G01M 5/0075* (2013.01); *B64C 27/006* (2013.01); *G01M 5/0025* (2013.01); *G01M 5/0033* (2013.01)

(58) Field of Classification Search
CPC ............. G01M 5/0075; G01M 5/0025; G01M 5/0033; B64C 27/006
See application file for complete search history.

(56) References Cited

U.S. PATENT DOCUMENTS

| | | | |
|---|---|---|---|
| 4,146,967 A * | 4/1979 | Rohner | G01B 5/205 33/530 |
| 4,272,781 A * | 6/1981 | Taguchi | G01N 27/9093 348/82 |
| 6,378,387 B1 * | 4/2002 | Froom | G01M 5/0075 73/865.8 |
| 6,498,642 B1 | 12/2002 | Duckett | |
| 8,347,746 B2 | 1/2013 | Hafenrichter et al. | |
| 8,713,998 B2 | 5/2014 | Troy et al. | |
| 9,302,787 B2 | 4/2016 | Hafenrichter et al. | |
| 9,335,303 B2 | 5/2016 | Voor, Jr. | |
| 9,746,445 B2 | 8/2017 | Hafenrichter et al. | |

(Continued)

FOREIGN PATENT DOCUMENTS

EP    3838767 A1    6/2021

*Primary Examiner* — Lina Cordero
*Assistant Examiner* — Lyudmila Zaykova-Feldman
(74) *Attorney, Agent, or Firm* — NEO IP

(57) ABSTRACT

The present invention is directed to an apparatus including a first central base attached to a second central base, connected by a bridge, with a space defined between the two central bases. The first central base and the second central base are each attached to a plurality of wheels extending into the space between the two central bases, with the plurality of wheels configured to translate the apparatus along a rotorcraft blade. The first central base and/or the second central base include a recess configured to receive a connection arm attached to a non-destructive scanning device. The apparatus is able to be used for ultrasonic, radiographic, eddy current, thermographic, acoustic, or visual non-destructive testing.

20 Claims, 13 Drawing Sheets

(56) References Cited

U.S. PATENT DOCUMENTS

| | | |
|---|---|---|
| 10,717,162 B2 | 7/2020 | Hafenrichter et al. |
| 10,823,709 B2 | 11/2020 | Hafenrichter et al. |
| 11,149,718 B2 | 10/2021 | Georgeson et al. |
| 2003/0057258 A1* | 3/2003 | Ishida ................ B23K 20/1245 228/175 |
| 2005/0274188 A1* | 12/2005 | Cabanis ............... G01N 29/275 73/618 |
| 2006/0042391 A1 | 3/2006 | Georgeson et al. |
| 2006/0097719 A1* | 5/2006 | Moore ................... G01N 27/82 324/237 |
| 2007/0044563 A1* | 3/2007 | Sarr ..................... G01N 29/226 73/618 |
| 2014/0305217 A1* | 10/2014 | Tapia ................ G01N 27/9013 901/44 |
| 2016/0368134 A1 | 12/2016 | Hafenrichter et al. |
| 2019/0186470 A1* | 6/2019 | Georgeson ............. G01P 15/08 |

* cited by examiner

NON-DESTRUCTIVE SCANNING DEVICE FOR AIRFOIL-SHAPED BODIES

CROSS-REFERENCE TO RELATED APPLICATIONS

This application is related to and claims priority from the following US patents and patent applications: this application claims priority from and the benefit of U.S. Provisional Patent Application No. 63/351,626, filed Jun. 13, 2022. Each of the above applications is incorporated herein reference in its entirety.

BACKGROUND OF THE INVENTION

1. Field of the Invention

The present invention relates to non-destructive testing devices and more specifically to ultrasonic and/or eddy current non-destructive testing devices for rotorcraft blades or other airfoil-shaped bodies.

2. Description of the Prior Art

It is generally known in the prior art to provide scanning apparatuses able to attach to a leading edge and a trailing edge of a rotorcraft blade and other airfoil-shaped bodies, with the scanning apparatuses including sensors able to scan a section of the airfoil-shaped bodies.

Prior art patent documents include the following:

U.S. Pat. No. 9,335,303 for Ultrasonic scanning fixture assembly by inventor Voor, filed Oct. 7, 2013 and issued May 10, 2016, discloses an apparatus for use in scanning a material includes a top member having a first body with a first plurality of holes; a bottom member having a second body with a second plurality of holes; and an interconnecting member connecting the top member and the second member to provide a gap between the top member and the bottom member. Each hole in the top member is aligned with a corresponding hole in the bottom member to form a hole-pair.

U.S. Pat. No. 11,149,718 for Methods and apparatus for maintaining airfoil-shaped body using cart that follows trailing edge by inventors Georgeson et al., filed Aug. 21, 2018 and issued Oct. 19, 2021, discloses a motorized rolling maintenance cart that utilizes the angled trailing edge geometry of an airfoil-shaped body (such as a wind turbine blade or rotor blade) to traverse the length of the airfoil-shaped body. The trailing edge-following maintenance cart may be used to carry personnel doing maintenance activities on the blades, such as local repairs or re-painting. In accordance with one aspect, the maintenance cart carries non-destructive inspection sensor units or other maintenance hardware over the surface of the airfoil-shaped body (e.g., in a spanwise direction). In accordance with another aspect, the trailing edge-following maintenance cart is configured to also provide fall protection to one or more independently movable crawler vehicles by means of cables. Alternative embodiments may include only one of the two aspects.

U.S. Pat. No. 10,823,709 for Methods and apparatus for realigning and re-adhering a hanging crawler vehicle on a non-level surface by inventors Hafenrichter et al., filed Jul. 6, 2018 and issued Nov. 3, 2020, discloses an apparatus and methods for realigning and re-adhering a hanging tool-equipped crawler vehicle with respect to a non-level surface of a target object. When the cable-suspended crawler vehicle with suction devices is adhered to a non-level surface of a target object, it is possible for the crawler vehicle to detach from the surface and be left hanging from the end of the cable in a state. While hanging from the end of the cable in a misaligned state and not in contact with the target object, the crawler vehicle is unable to carry out a planned maintenance operation. Before the maintenance operation is resumed, the crawler vehicle is realigned with the surface of the target object using a turret, a rotating arm or a cam-shaped roll bar provided as equipment on the crawler vehicle and then re-adhered to the surface by activation of the suction devices.

U.S. Pat. No. 8,347,746 for Crawling automated scanner for non-destructive inspection of aerospace structural elements by inventors Hafenrichter et al., filed Jan. 19, 2010 and issued Jan. 8, 2013, discloses an apparatus for non-destructive inspection of structural elements or workpieces, in particular those having an airfoil configuration, that moves a scanning sensor across the width (span) of a structural element or workpiece for the purpose of detecting structural damage. In one embodiment, the apparatus simultaneously traverses the length (chord) of the structural element or workpiece. In another embodiment, the apparatus includes a guide rail that encompasses the structural element or workpiece and the scanning sensor travels along the guide rail from a first location at an upper rear region, to the front, of the structural element or workpiece, and then around the leading edge toward the lower rear region. The apparatus includes a processor and a display device to display the processed, sensed, information.

U.S. Pat. No. 9,746,445 for Apparatus for automated non-destructive inspection of airfoil-shaped bodies by inventors Hafenrichter et al., filed Apr. 16, 2013 and issued Aug. 29, 2017, discloses an automated blade crawler capable of scanning a multiplicity of non-destructive inspection sensors over a surface of an airfoil-shaped body such as a blade component. The blade crawler is movable in a spanwise direction, thereby enabling a sensor array to inspect the surface area on one or both sides of the blade component in one pass. The sensors concurrently output scan imaging data which is multiplexed, the multiplexed being transmitted (via an electrical cable or wirelessly) to data collection and display hardware at an operations control center.

U.S. Pat. No. 9,302,787 for Vacuum adhering apparatus for automated maintenance of airfoil-shaped bodies by inventors Hafenrichter et al., filed Mar. 5, 2014 and issued Apr. 5, 2016, discloses devices for enabling navigation of a crawler vehicle along an airfoil-shaped body, such as a rotorcraft blade, in a low-cost fashion with high reliability, especially for swept configuration blades. Using the natural tendency of vacuum adherence devices to adhere to changing surface contours, the crawler vehicle can adhere itself to airfoil-shaped structures in a way that allows the crawler vehicle to easily translate along an airfoil-shaped body while accommodating extreme variations along the surface of the airfoil-shaped body. The crawler vehicle can be designed to eliminate any trailing edge follower wheel, which simplifies the crawler's ability to accommodate trailing edge protrusions, such as trim tabs.

U.S. Pat. No. 10,717,162 for Automated apparatus for moving an end effector over a surface of an airfoil-shaped body by inventors Hafenrichter et al., filed Dec. 7, 2017 and issued Jul. 21, 2020, discloses an automated apparatus comprising: a chassis configured to be mounted on an airfoil-shaped body without contacting its trailing edge; a carriage translatably coupled to the chassis; and an end effector pivotably coupled to the carriage. The chassis comprises: a frame; a motorized drive rolling element rotatably coupled to the frame; a rocker mechanism pivotably coupled to the frame; first and second ball and socket bearings mounted to opposing ends of the rocker arm; and a third ball and socket bearing mounted to the frame. During a maintenance procedure, the airfoil-shaped body is oriented at a non-zero angle of attack with the leading edge higher than the trailing edge and with the balls of the ball and socket bearings in contact with the airfoil-shaped body. A gravitational force exerted urges the chassis toward the trailing edge of the airfoil-shaped body for all chordwise positions of the carriage.

SUMMARY OF THE INVENTION

The present invention relates to non-destructive testing devices and more specifically to ultrasonic and/or eddy current non-destructive testing devices for rotorcraft blades or other airfoil-shaped bodies.

It is an object of this invention to provide a device for more easily and more accurately performing non-destructive testing, such as ultrasonic testing, on a rotorcraft blade or other airfoil-shaped body in order to determine quality of manufacturing, monitor damage, monitor features of interest, discern whether elements of the blade are correctly bonded, or finding areas of damage, both during manufacturing and while in service.

In one embodiment, the present invention is directed to an apparatus for non-destructively scanning rotorcraft blades, including a central base, including a top component and a bottom component bridged by and integrally formed with a connector, and an inspection module attached to an elongate member including at least one peg, wherein at least one bottom wheel extends from the bottom component inwardly toward the top component, wherein at least one top wheel extends from the top component inwardly toward the bottom component, wherein the central base defines at least one recess extending longitudinally along the central base, wherein the at least one recess is configured to accept the at least one peg of the elongate member, and wherein the elongate member is rotatable about the at least one peg, such that the position of the inspection module with respect to the central base is able to be adjusted.

In another embodiment, the present invention is directed to a system for non-destructively scanning rotorcraft blades, including a blade scanning apparatus, including a central base, including a top component and a bottom component bridged by and integrally formed with a connector, an inspection module attached to an elongate member pivotably connected with a recess of the central base, and at least one user device in wireless communication with the inspection module, wherein the inspection module is operable to generate scan data for a test object and transmit the scan data to the at least one user device, wherein at least one bottom wheel extends from the bottom component inwardly toward the top component, and wherein at least one top wheel extends from the top component inwardly toward the bottom component.

In yet another embodiment, the present invention is directed to an apparatus for non-destructively scanning rotorcraft blades, including a central base, including a top component and a bottom component bridged by and integrally formed with a connector, and an inspection module attached to an elongate member pivotably connected with a recess of the central base, wherein the inspection module includes at least one fluid release mechanism operable to release marking fluid or dye proximate to an inspection area scanned by the inspection module, wherein a plurality of bottom wheels extend from the bottom component inwardly toward the top component, and wherein a plurality of top wheels extend from the top component inwardly toward the bottom component.

These and other aspects of the present invention will become apparent to those skilled in the art after a reading of the following description of the preferred embodiment when considered with the drawings, as they support the claimed invention.

DETAILED DESCRIPTION

Figure 1:
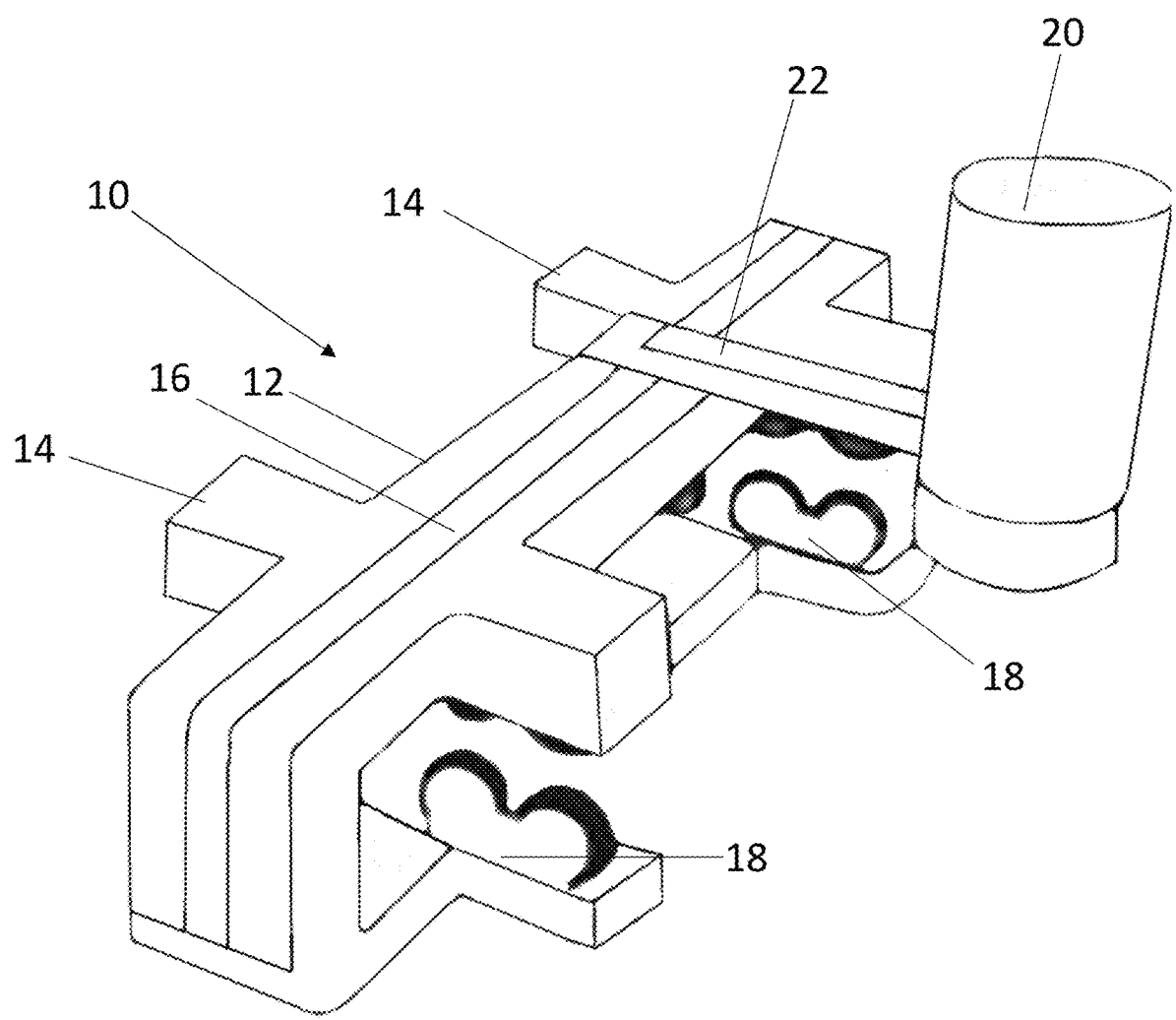
FIG. 1 illustrates a perspective view of a rotorcraft blade scanning apparatus according to one embodiment of the present invention.

The present invention relates to non-destructive testing devices and more specifically to ultrasonic and/or eddy current non-destructive testing devices for rotorcraft blades or other airfoil-shaped bodies.

In one embodiment, the present invention is directed to an apparatus for non-destructively scanning rotorcraft blades, including a central base, including a top component and a bottom component bridged by and integrally formed with a connector, and an inspection module attached to an elongate member including at least one peg, wherein at least one bottom wheel extends from the bottom component inwardly toward the top component, wherein at least one top wheel extends from the top component inwardly toward the bottom component, wherein the central base defines at least one recess extending longitudinally along the central base, wherein the at least one recess is configured to accept the at least one peg of the elongate member, and wherein the elongate member is rotatable about the at least one peg, such that the position of the inspection module with respect to the central base is able to be adjusted.

In another embodiment, the present invention is directed to a system for non-destructively scanning rotorcraft blades, including a blade scanning apparatus, including a central base, including a top component and a bottom component bridged by and integrally formed with a connector, an inspection module attached to an elongate member pivotably connected with a recess of the central base, and at least one user device in wireless communication with the inspection module, wherein the inspection module is operable to generate scan data for a test object and transmit the scan data to the at least one user device, wherein at least one bottom wheel extends from the bottom component inwardly toward the top component, and wherein at least one top wheel extends from the top component inwardly toward the bottom component.

In yet another embodiment, the present invention is directed to an apparatus for non-destructively scanning rotorcraft blades, including a central base, including a top component and a bottom component bridged by and integrally formed with a connector, and an inspection module attached to an elongate member pivotably connected with a recess of the central base, wherein the inspection module includes at least one fluid release mechanism operable to release marking fluid or dye proximate to an inspection area scanned by the inspection module, wherein a plurality of bottom wheels extend from the bottom component inwardly toward the top component, and wherein a plurality of top wheels extend from the top component inwardly toward the bottom component.

One of ordinary skill in the art will understand that where the present invention describes a system capable of scanning, in a preferred embodiment, rotorcraft blades, the teachings of the present invention are not limited to use with rotorcraft blades, but are able to be used for other airfoil-shaped objects as well. For example, the rotorcraft blade scanning apparatus taught by the present invention is able to be configured to fit, for example, wind turbine blades, airplane wings, and other airfoil-shaped bodies.

None of the prior art discloses devices capable of scanning rotorcraft blades with a system capable of easily translating along the rotorcraft blades. Furthermore, none of the prior art discloses devices able to easily scan the underside of a rotorcraft blade without turning the blade over and running the system on the opposite side of the blade.

Before or after installing rotorcraft blades (e.g., helicopter blades, gyrocopter, vertical take-off and landing (VTOL) aircraft, etc.), it is frequently necessary to scan the blades in order to ensure that the blades were properly manufactured and that installation of the blades did not damage the blades in a way that will cause them to catastrophically fail. Furthermore, while rotorcraft blades are in service, it is necessary to regularly check the condition of the blades to ensure the vehicle is still fit for service. Additionally, because rotorcraft blades are subject to fatigue and crack growth and are frequently impacted by debris or surface erosion during use, it is necessary to regularly inspect the rotorcraft blades in order to ensure that the blades remain able to be used without substantial risk of failing.

Existing systems for scanning rotorcraft blades typically require the rotorcraft blade to be detached from the rotorcraft, an often onerous, costly, and time-consuming task that could itself lead to damage to the rotorcraft blade. By contrast, the present system is able to scan rotorcraft blades while they are still mounted. Critically, the present system is able to scan the entirety of the surface of the rotorcraft blade, including the edges. This differs from any prior art systems, which attempt to mount to the edges of the blade and therefore face difficulty in scanning those edges. However, the edges of the rotorcraft blade are important to scan, particularly the leading edge (covered by an abrasion strip), as this edge is one of the areas of the blade that is most susceptible to damage from continuous use. This strip often requires manual inspection by current systems even if an automatic system is used elsewhere for scanning the blade, causing inefficiency.

Existing systems also include several inconveniences that reduce efficiency or accuracy of the devices. For example, the system described in U.S. Pat. No. 9,335,303 includes a plurality of preset holes on two sides of a device through which ultrasonic transducers are able to be inserted. However, the use of preset holes means that the area that will be scanned by the device is limited by spacing between the holes and gaps are likely to occur, decreasing accuracy. Furthermore, the system in U.S. Pat. No. 9,335,303 requires holes on each side of the device to be precisely aligned in order to perform through-transmission scanning, which decreases the fidelity of the device if there are even small disturbances to the orientation of the device. Additionally, the system in U.S. Pat. No. 9,335,303 is affixed to the helicopter blade by screws to stabilize it and the system does not include any means (e.g., wheels) for translating along the helicopter blade, greatly limiting its ability to slide along the blade to thoroughly scan it. Therefore, the present invention provides an improvement over the prior art by providing an apparatus easily able to translate across a rotorcraft blade.

Referring now to the drawings in general, the illustrations are for the purpose of describing one or more preferred embodiments of the invention and are not intended to limit the invention thereto.

FIG. 1 illustrates a perspective view of a rotorcraft blade scanning apparatus according to one embodiment of the present invention. The rotorcraft blade scanning apparatus 10 includes a central base 12, with a plurality of wheel housings 14 extending horizontally from the central base 12. A translation recess 16 extends from a position proximate one end of the central base 12 to a position proximate the other end of the central base 12. The translation recess 16 is an elongated indentation in a top surface of the central base 12. A first end of a translation arm 22 is configured to attach to the translation recess 16 and slide along the translation recess 16. A second end of the translation arm 22 is attached to a sensor device 20. It is advantageous for the translation 22 to be relatively short, such that the sensor device 20 is held near the plurality of wheel housings (e.g., about 3-4 inches away) in order to assist in tightly controlling the movement of the sensor device 20. In one embodiment, the sensor device 20 includes at least one ultrasonic probe (e.g., a transducer operable to emit and receive ultrasonic waves), operating in pulse echo mode. In one embodiment, the at least one ultrasonic probe includes at least one portable ultrasonic probe. In one embodiment, the at least one ultrasonic probe is able to utilize ultrasonic resonance scanning as an inspection modality, enabling it to be particularly useful in scanning cored structures (e.g., Nomex, ROHA-CELL foam, etc.). In another embodiment, the sensor device 20 includes at least one eddy current probe, at least one low frequency bond tester, at least one terahertz probe/imager, at least one acoustic probe, at least one tap tester, at least one thermographic probe (e.g., for flash thermography, line thermography, etc.), at least one radiation probe (e.g., a probe operable to release and/or detect X-ray radiation and/or gamma ray radiation), at least one optical probe, at least one capacitive probe, at least one sensor for laser shearography, at least one optical profilometer, and/or at least one camera. In one embodiment, the sensor device 20 includes more than one type of probe (e.g., at least one eddy current probe and at least one ultrasonic probe). One of ordinary skill in the art will understand that the types of probes contained within the sensor device 20 are not intended to be limiting, and that any probe suitable for performing non-destructive testing, non-destructive evaluation, and/or non-destructive inspection are able to be used in the present invention. One of ordinary skill in the art will understand that the term "probe" as used herein refers to both single element transducers and arrays of multiple sensors (e.g., an ultrasonic phased array device).

In one embodiment, an eddy current sensor is specifically utilized when scanning an abrasion strip on a leading edge of the rotorcraft blade, while the eddy current sensor or a different inspection modality (e.g., ultrasonic) is used in scanning the remainder of the blade.

One of ordinary skill in the art will understand that where an ultrasonic transducer is said to be used in the present invention, such an ultrasonic transducer is able to be replaced with a system capable of inducing ultrasonic waves with laser-based technology (i.e., laser ultrasound). Furthermore, the ultrasonic transducer is able to be replaced with any other type of non-destructive testing technology known in the art.

In one embodiment, the sensor device 20 is attached to at least one camera and/or at least one laser scanning device operable to generate a digital scan of the surface of the test object. The digital scan is able to supplement or compliment the at least one probe used in the sensor device 20 as an inspection tool, or is able to generate optical and/or profilometric images of the surface to be archived with the test data.

In one embodiment, the sensor device 20 is attached to at least one coupling fluid extruder, wherein the coupling fluid extruder is operable to secrete coupling fluid between the sensor device 20 and the helicopter blade. In instances where the sensor device 20 includes an ultrasonic transducer, the coupling fluid assists in ensuring that the ultrasonic transducer is properly coupled to the helicopter blade being scanned. However, in one embodiment, the system does not include a coupling fluid extruder and/or does not utilize coupling fluid, as the ultrasonic transducer is able to include air-coupled ultrasonic transducers that do not require coupling fluid. In one embodiment, the sensor device 20 is able to be moved upwardly and downwardly along the translation arm 22. In one embodiment, the sensor device 20 is attached to a motor operable to move the sensor device 20 upwardly and downwardly along the translation arm 22. In one embodiment, when the sensor device 20 is in a maximally downward position, the sensor device 20 is directly proximate to the helicopter blade, allowing the helicopter blade to be more easily coupled with the sensor device 20. In one embodiment, when the sensor device 20 is in a maximally upward position, the sensor device 20 is able to be more easily rotated around the rotorcraft blade scanning apparatus.

In one embodiment, the sensor device 20 is attached to at least one marking fluid extruder. The at least one marking fluid extruder is operable to release dye onto an area of the rotorcraft blade, indicating an area to investigate further. In one embodiment, the at least one marking fluid extruder is configured to automatically release dye or gel upon determination of at least one potential abnormality in the rotorcraft blade by an artificial intelligence module. In additional to marking areas with potential abnormalities, the dye is also useful for marking areas with data dropout, which will need to be scanned further in order to thoroughly investigate the structure. In one embodiment, the at least one marking fluid extruder secretes dye onto the helicopter blade when the at least one marking fluid extruder receives an input from a remote device in network communication with the rotorcraft blade scanning apparatus. In one embodiment, the at least one marking fluid extruder is able to be supplemented or replaced with another marking device. The marking device is not limited to extruding dye, but is also able to release other indicators, such as placing a stack on the surface of the test object. In another embodiment, the marking device includes at least one writing utensil (e.g., a crayon, a pencil, a pen, a permanent marker, etc.) operable to mark the test object at points to be investigated further.

In one embodiment, a plurality of wheels 18 extend downward from the plurality of wheel housings 14 extending from the central base 12. When scanning a rotorcraft blade, the plurality of wheels 18 are in contact with a top surface of the rotorcraft blade, and oriented such that the plurality of wheels are operable to translate the rotorcraft blade scanning apparatus 10 longitudinally (i.e., along the longest axis of the rotorcraft blade) along the rotorcraft blade. In one embodiment, the plurality of wheels 18 are connected to a locking mechanism, which, when engaged, prevents the plurality of wheels 18 from moving, thereby locking the rotorcraft blade scanning apparatus 10 to a particular position on the rotorcraft blade. The locking mechanism is useful both for allowing the apparatus to be securely positioned at one point along an airfoil-shaped body, and potentially for serving as a safety brake, in to prevent the apparatus from sliding and potentially damaging one or more parts or injuring an operator of the parts. In one embodiment, more than one of the plurality of wheels are contained within a single track, which articulates with the surface of the rotorcraft blade, providing improved traction and system alignment. One of ordinary skill in the art will understand that the plurality of wheels 18 are not intended to be limiting and are able to be replaced with other devices capable of articulating with and translating on the rotorcraft blade (e.g., roller balls, rigid low-friction nubs, etc.).

Figure 2:
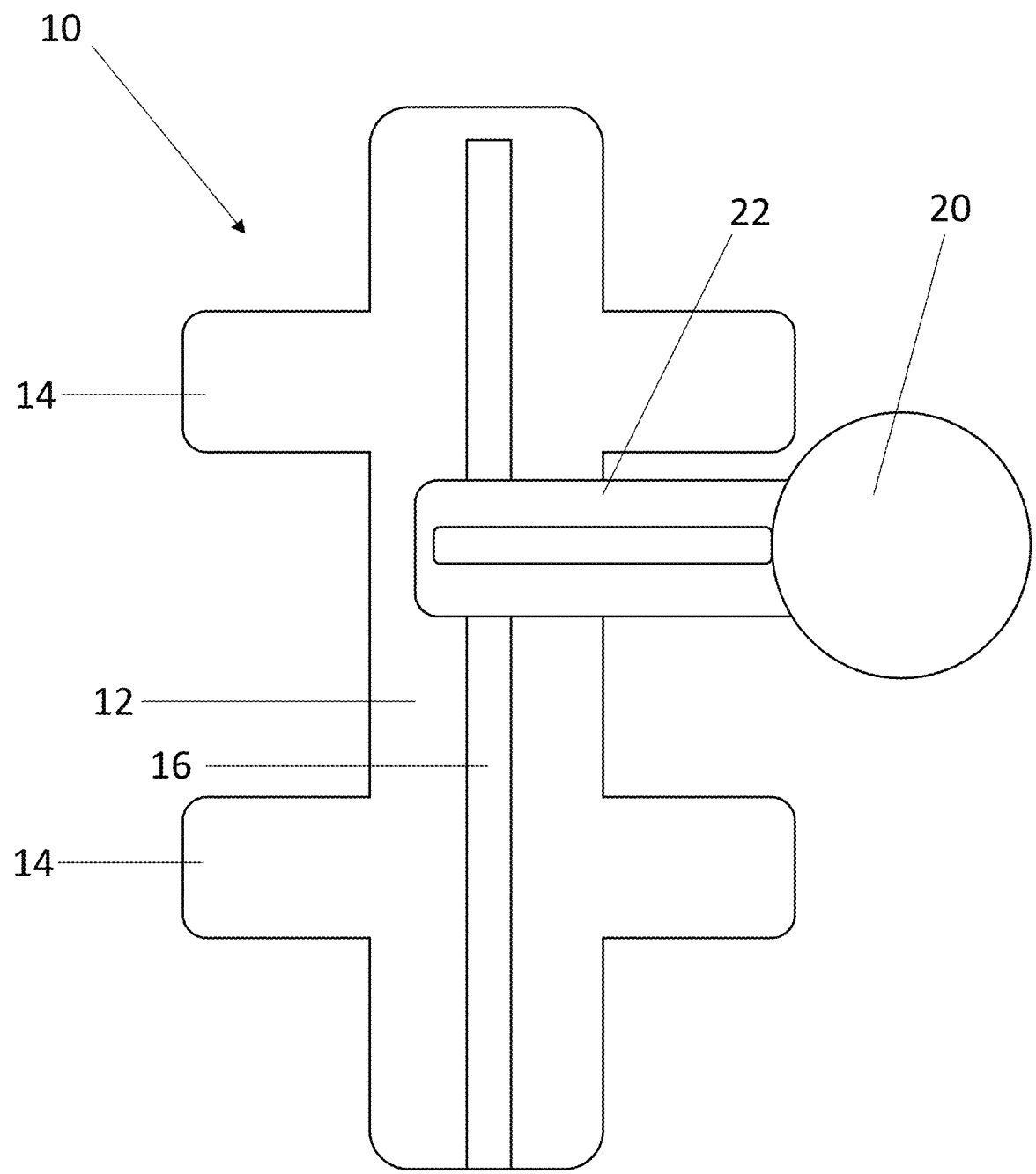
FIG. 2 illustrates a top view of a rotorcraft blade scanning apparatus according to one embodiment of the present invention.

FIG. 2 illustrates a top view of a rotorcraft blade scanning apparatus according to one embodiment of the present invention. In one embodiment, the translation arm 22 is fully pivotable (i.e., able to rotate 360°) about the central base 12, meaning that the sensor device 20 is able to be positioned on the left side or on the right side of the central base 12.

Figure 3A:
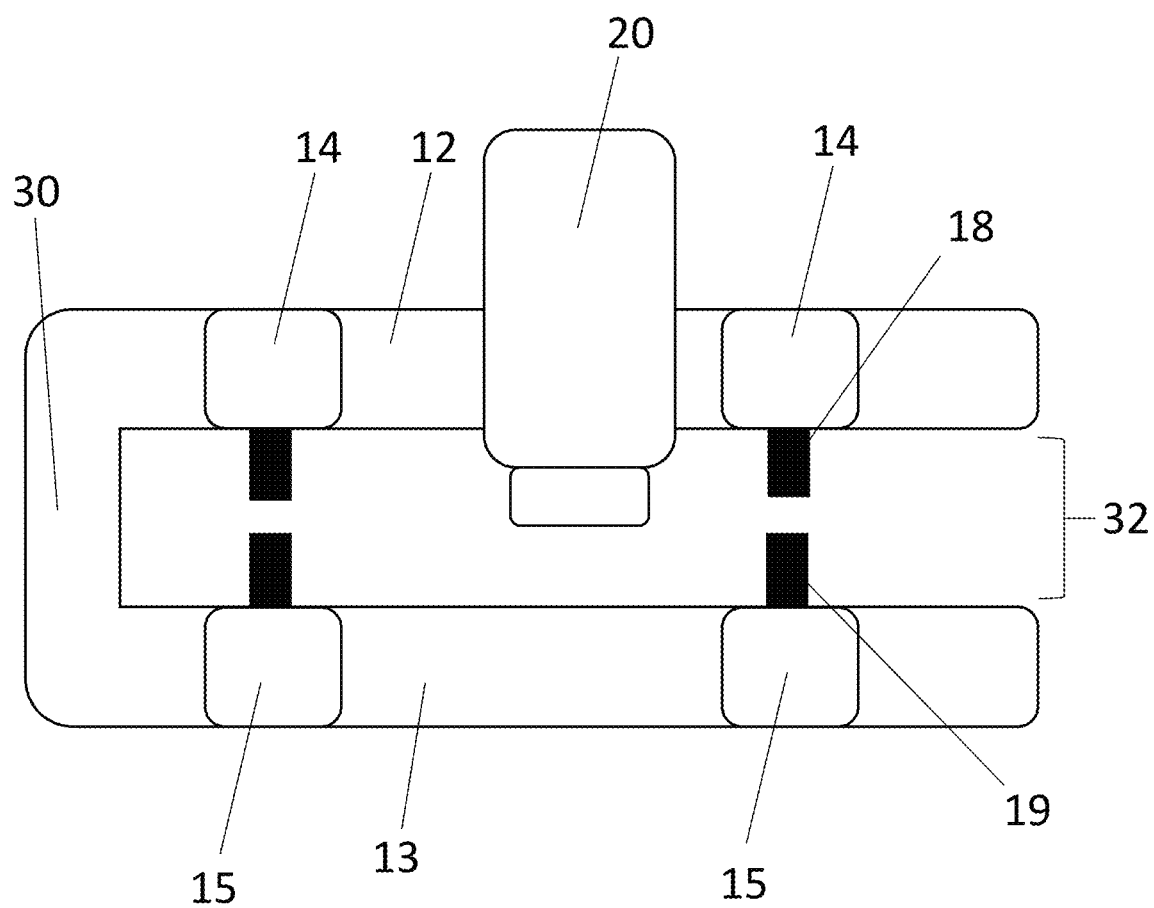
FIG. 3A illustrates a side orthogonal view of a rotorcraft blade scanning apparatus according to one embodiment of the present invention.

FIG. 3A illustrates a side orthogonal view of a rotorcraft blade scanning apparatus according to one embodiment of the present invention. As shown in FIG. 3A, the rotorcraft blade scanning apparatus 10 includes a first central base 12 and a second central base 13. The first central base 12 and the second central base 13 are substantially parallel. A connector 30 extends orthogonally from a first end of the first central base 12 to a first end of the second central base 13, thereby connecting the first central base 12 to the second central base 13. In one embodiment, only the first end of the first central base 12 and the first end of the second central base 13 are connected. Otherwise, a gap 32 is defined between the first central base 12 and the second central base 13. As mentioned with respect to FIG. 1., a first plurality of wheel housings 14 extend horizontally outwardly from the first central base 12. In addition, a second plurality of wheel housings 15 extend horizontally outwardly from the second central base 13. A first plurality of wheels 18 extend vertically downwardly from the first plurality of wheel housings 14 and a second plurality of wheels 19 extend vertically upwardly from the second plurality of wheel housings 15. In one embodiment, when the helicopter blading scanning apparatus is positioned on a rotorcraft blade, the first plurality of wheels 18 is configured to contact one surface of the rotorcraft blade (e.g., the top surface or the bottom surface) and the second plurality of wheels 19 is configured to contact an opposite surface of the rotorcraft blade, such that both the first plurality of wheels 18 and the second plurality of wheels 19 contact the rotorcraft blade simultaneously, providing additional stability. In another embodiment, only one of the plurality of wheels contacts the rotorcraft blade at one time. In one embodiment, the first plurality of wheels 18 and the second plurality of wheels 19 each have a substantially flat contact profile (as opposed to a rounded contact profile), such that the wheels are better able to tightly grip the rotorcraft blade.

Figure 3B:
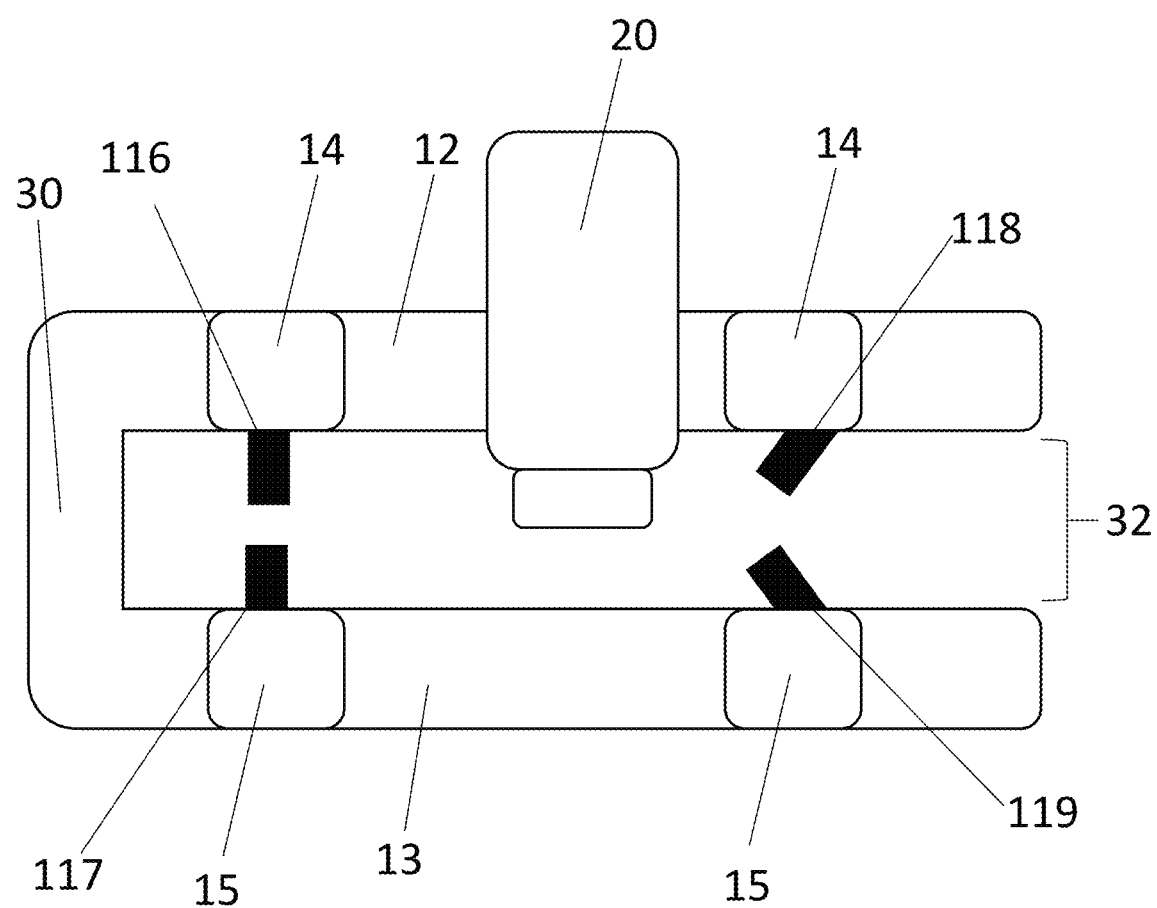
FIG. 3B illustrates a side orthogonal view of a rotorcraft blade scanning apparatus having cambered wheels according to one embodiment of the present invention.

In one embodiment, as shown in FIG. 3B, the wheels 118 of the rotorcraft blade scanning apparatus contacting a leading edge of the rotorcraft blade and/or those contacting the trailing edge of the rotorcraft blade are cambered. Because rotorcraft blades are airfoils and therefore do not have flat surfaces, cambering the wheels assists in providing stability to the rotorcraft blade scanning apparatus and better ensures that it is able to move straight along the rotorcraft blade (or more precisely able to move along the feathering axis of the rotorcraft blade). In one embodiment, each of the wheels of the rotorcraft blade scanning apparatus are cambered. In one embodiment, each of the first plurality of wheels 116, 118 are cambered, and each of the second plurality of wheels 117, 119 have zero camber. In one embodiment, each of the second plurality of wheels 117, 119 are cambered, and each of the first plurality of wheels 116, 118 have zero camber. In one embodiment, the wheels of the first plurality of wheels 118 that contact the leading edge of the rotorcraft blade and wheels of the second plurality of wheels 119 that contact the leading edge of the rotorcraft blade are cambered, while wheels of the first plurality of wheels 116 that contact the trailing edge of the rotorcraft blade and wheels of the second plurality of wheels 117 that contact the trailing edge of the rotorcraft blade have zero camber. In one embodiment, the wheels of the first plurality of wheels 116 that contact the trailing edge of the rotorcraft blade and wheels of the second plurality of wheels 117 that contact the trailing edge of the rotorcraft blade are cambered, while wheels of the first plurality of wheels 118 that contact the leading edge of the rotorcraft blade and wheels of the second plurality of wheels 119 that contact the leading edge of the rotorcraft blade have zero camber. In one embodiment, the wheels of the first plurality of wheels 118 that contact the leading edge of the rotorcraft blade and wheels of the second plurality of wheels 117 that contact the trailing edge of the rotorcraft blade are cambered, while wheels of the first plurality of wheels 116 that contact the trailing edge of the rotorcraft blade and wheels of the second plurality of wheels 119 that contact the leading edge of the rotorcraft blade have zero camber. In one embodiment, the wheels of the first plurality of wheels 116 that contact the trailing edge of the rotorcraft blade and wheels of the second plurality of wheels 119 that contact the leading edge of the rotorcraft blade are cambered, while wheels of the first plurality of wheels 118 that contact the leading edge of the rotorcraft blade and wheels of the second plurality of wheels 117 that contact the trailing edge of the rotorcraft blade have zero camber.

In one embodiment, each of the first plurality of wheels 116, 118 and the second plurality of wheels 117, 119 have independently adjustable camber. By way of example and not limitation, in one embodiment, at least one knob extends outwardly from an exterior surface of the central base 12, wherein rotation of the at least one knob adjusts the camber of at least one of the plurality of wheels. In one embodiment, for each of the plurality of wheels, at least one knob extends outwardly from a position on the exterior surface proximate to the plurality of wheels, such that turning the at least one knob adjusts the camber of the adjacent plurality of wheels. In one embodiment, the apparatus is able to adjust the distance each of the first plurality of wheels 116, 118 and the second plurality of wheels 117, 119 protrude from the central base 12, 13. By adjusting both the camber and the protrusion distance of each of the plurality of wheels independently, the apparatus is better able to tightly fit onto any rotorcraft blade or other airfoil-shaped body.

Figure 3C:
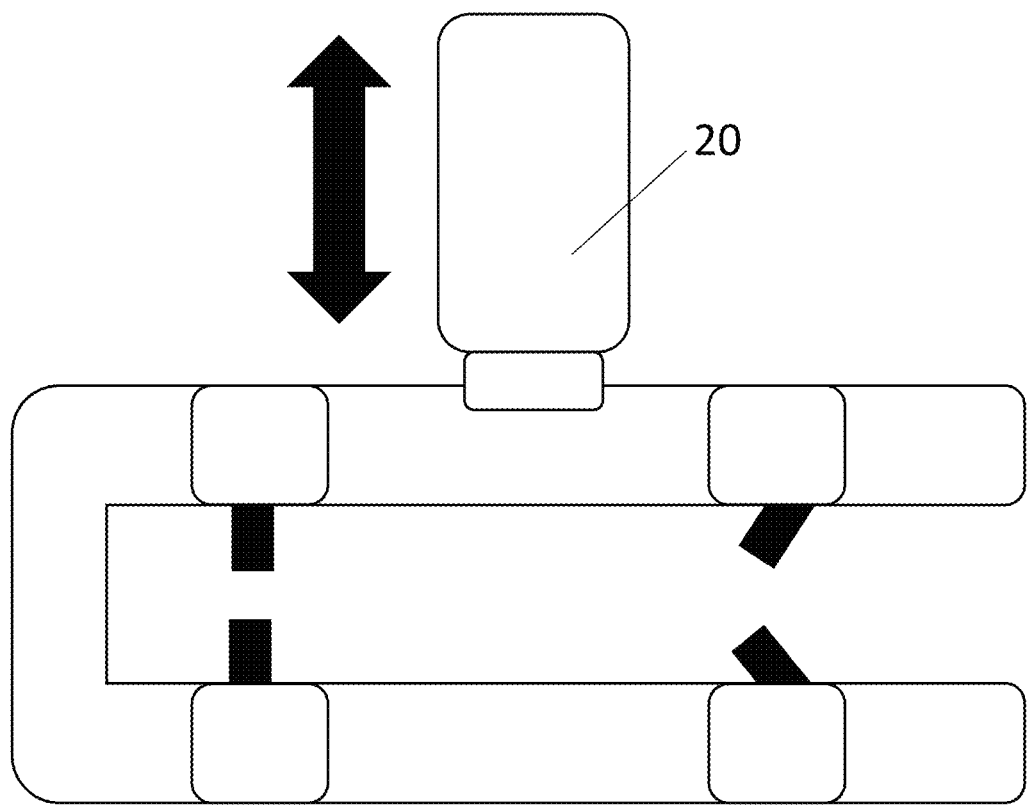
FIG. 3C illustrates a side orthogonal view of a rotorcraft blade scanning apparatus with a sensor device in an upward position according to one embodiment of the present invention.

FIG. 3C illustrates a side orthogonal view of a rotorcraft blade scanning apparatus with a sensor device in an upward position according to one embodiment of the present invention. In one embodiment, the sensor device 20 includes a side track extending vertically along the sensor device 20, which is operable to receive an end of the translation arm 22. In one embodiment, the sensor device 20 is therefore able to move upwardly or downwardly relative to the translation arm 22. This is useful as, in an upward position, the sensor device 20 is able to rotate freely around the central base 12, and, while in a downward position, the sensor device 20 is positioned proximate to the surface of the test object.

Figure 3D:
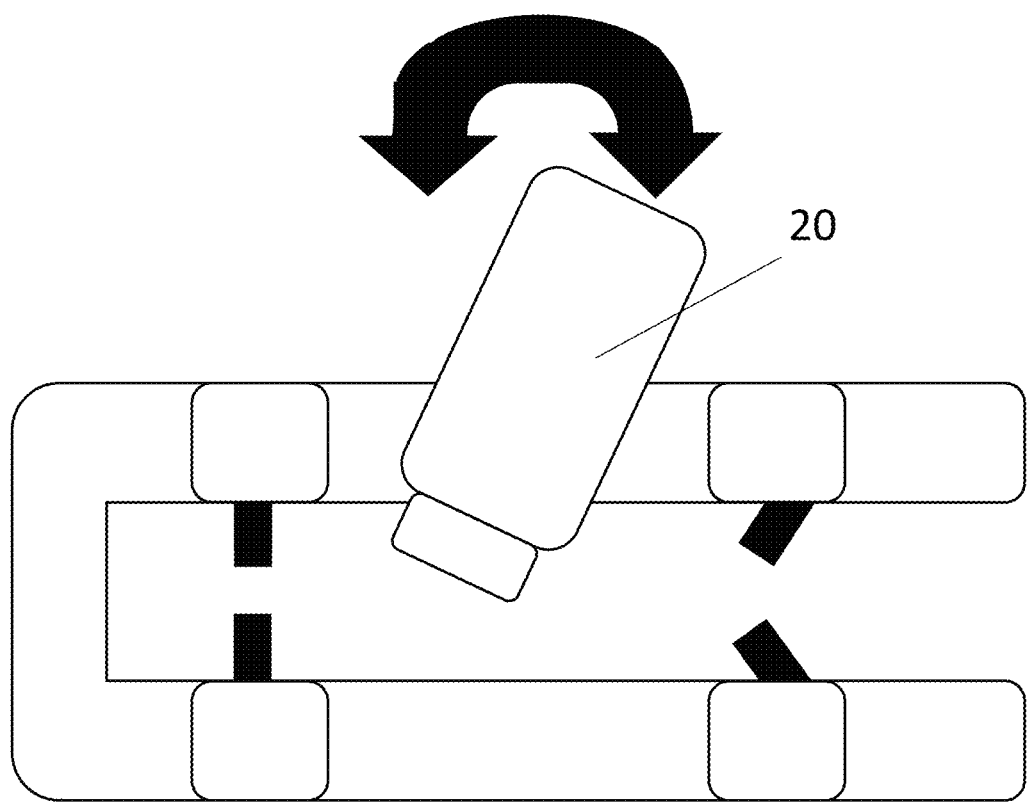
FIG. 3D illustrates a side orthogonal view of a rotorcraft blade scanning apparatus with a sensor device tilted left according to one embodiment of the present invention.]

FIG. 3D illustrates a side orthogonal view of a rotorcraft blade scanning apparatus with a sensor device tilted clockwise according to one embodiment of the present invention. In one embodiment, the sensor device 20 is pivotably attached to the end of the translation arm 22, such that, when viewed from the side of the rotorcraft blade scanning apparatus, the sensor device 20 is able to rotate clockwise or counterclockwise. This movement is useful, as the surface of an airfoil is necessarily not completely flat. Therefore, in addition to the translation 22 needing to slide along the central base 12 of the apparatus, the sensor device 20 also needs to rotate in order to maintain the sensor device 20 substantially orthogonal to the surface of the test object. In one embodiment, the rotorcraft blade scanning apparatus is operable to receive scan data from the sensor device 20 and automatically calibrate the angle of the sensor device 20 based on the scan data.

Figure 4:
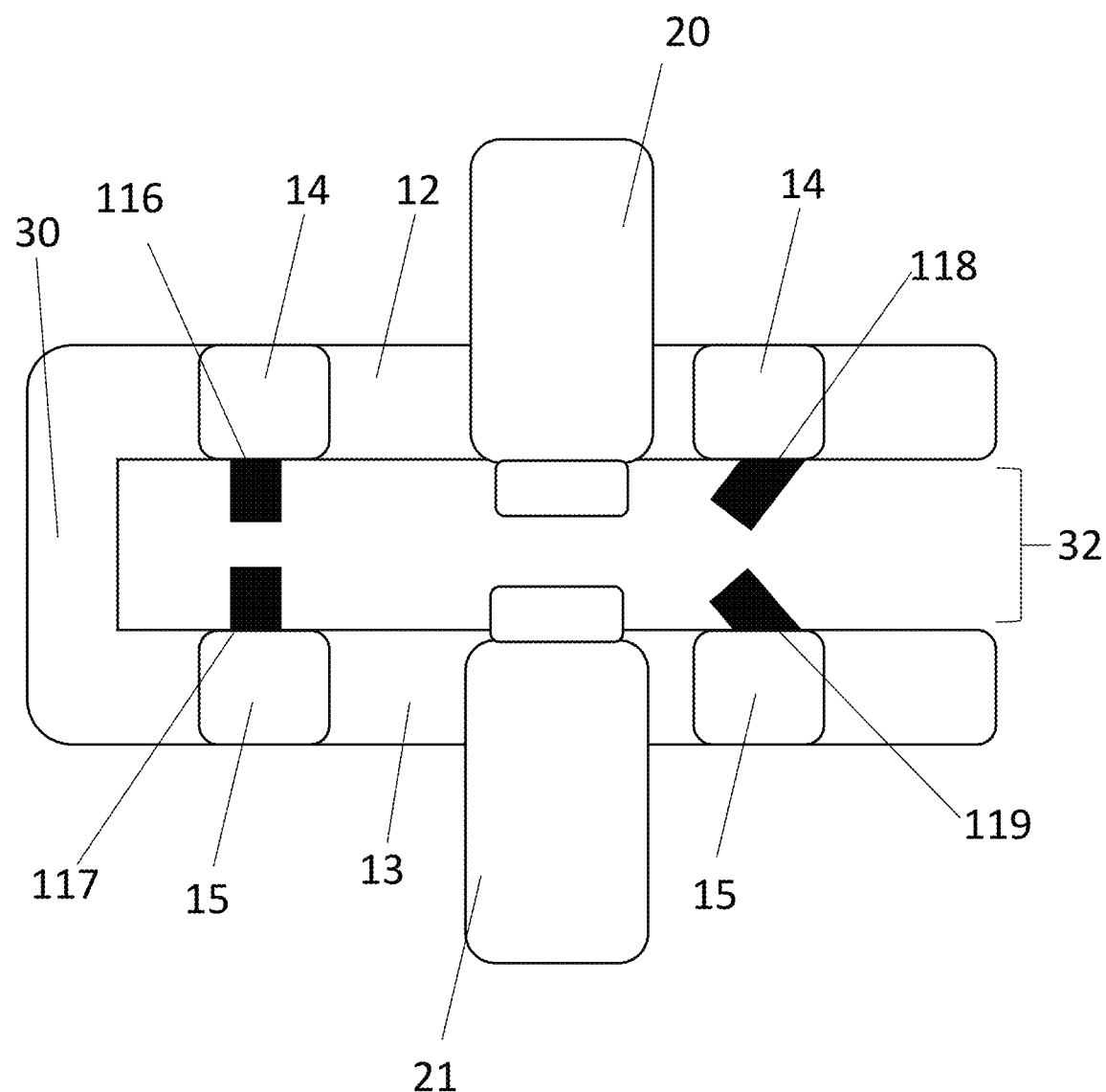
FIG. 4 illustrates a side orthogonal view of a rotorcraft blade scanning apparatus having a transmitting sensor device and a receiving sensor device according to one embodiment of the present invention.

FIG. 4 illustrates a side orthogonal view of a rotorcraft blade scanning apparatus having a transmitting sensor device and a receiving sensor device according to one embodiment of the present invention. In one embodiment, the rotorcraft blade scanning apparatus includes a first sensor device 20 and a second sensor device 21. The first sensor device 20 is attached to a translation arm connected to a first central base 12, while the second sensor device 21 is attached to a translation arm connected to a second central base 13. The first sensor device 20 and the second sensor device 21 are oriented in opposite directions, such that the first sensor device 20 scans at a bottom end of the first sensor device 20, while the second sensor device 21 scans at a top end of the first sensor device 21. Therefore, when the apparatus is fitted onto a rotorcraft blade, both the first sensor device 20 and the second sensor device 21 are aimed proximate to the surface of the rotorcraft blade. In one embodiment, the first sensor device 20 and the second sensor device 21 are used to perform separate scans, allowing the top side of the blade and the bottom side of the blade to be scanned at once for improved efficiency. In another embodiment, the first sensor device 20 is used to transmit a signal received by the second sensor device 21. In one example, the first sensor device 20 and the second sensor device 21 are used to perform through transmission ultrasonic scanning. In another embodiment, the first sensor device 20 is operable to produce radiation (e.g., X-rays) that passes through the rotorcraft blade and is received by the second sensor device 21.

In one embodiment, the first sensor device 20 and the second sensor device 21 are physically coupled, such that moving the first sensor device 20 along the central base 12 causes the second sensor device 21 to move along the central base 13 in the same direction and vice versa. In another embodiment, the first sensor device 20 and the second sensor device 21 are not physically coupled, but at least one stepper motor connected to the first sensor device 20 communicates with at least one stepper motor connected to the second sensor device 21, such that when the first sensor device 20 is moved along the central base 12, the second sensor device 21 is moved along the central base 13 such that the first sensor device 20 and the second sensor device 21 remain aligned. In one embodiment, when the first sensor device 20 rotates to the left or to the right, the second sensor device 21 is automatically moved along the central base 13 and rotated to the right or to the left, such that first sensor device 20 and the second sensor device 21 are pointing in directly opposite directions and are still directed at each other. In this way, the apparatus running in through-transmission mode does not require an operator to individually move each sensor device such that they are still aligned, but rather maintains this alignment automatically.

Figure 5:
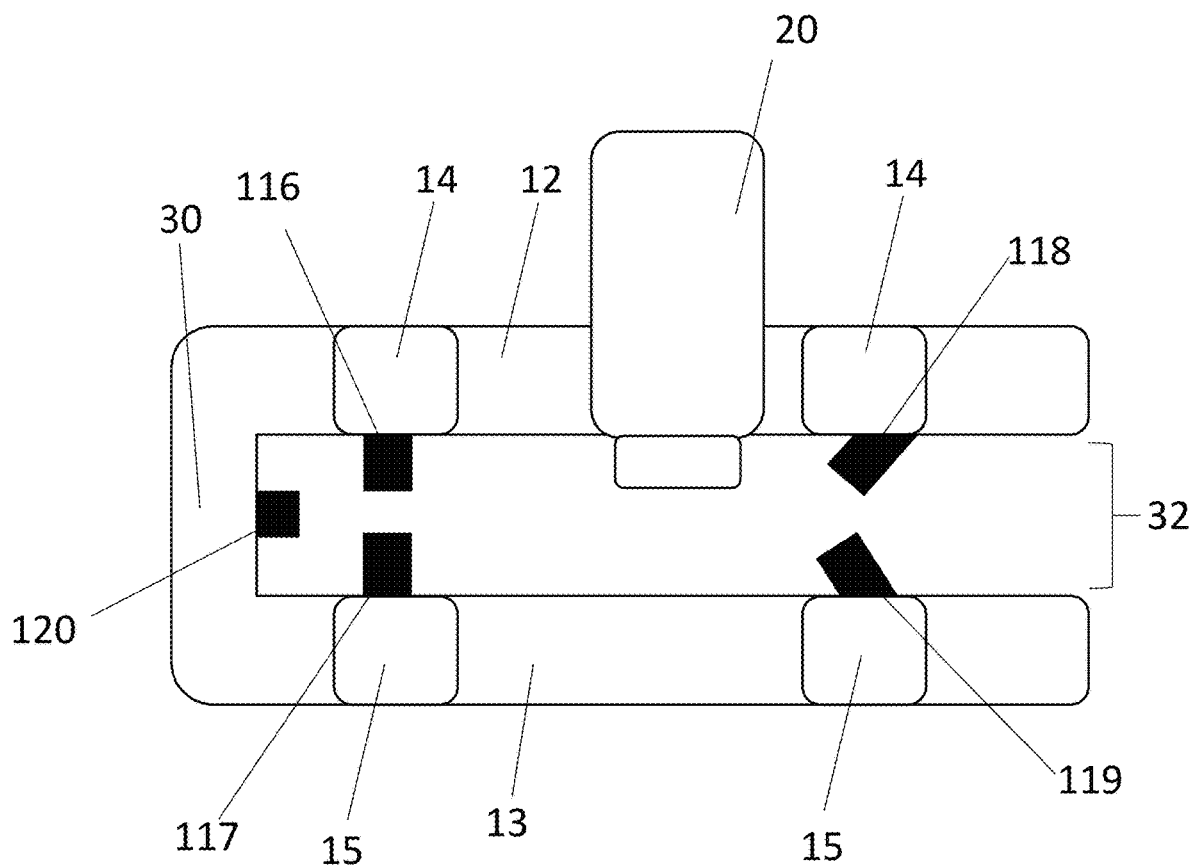
FIG. 5 illustrates a side orthogonal view of a rotorcraft blade scanning apparatus having a stabilizing wheel according to one embodiment of the present invention.

FIG. 5 illustrates a side orthogonal view of a rotorcraft blade scanning apparatus having a stabilizing wheel according to one embodiment of the present invention. In one embodiment, the rotorcraft blade scanning apparatus includes at least one stabilizing wheel 120 extending inwardly from an interior surface of the connector 30. When the apparatus is fitted around a rotorcraft blade, applying pressure between the rotorcraft blade and the at least one stabilizing wheel 120 helps to ensure that the apparatus remains aligned as it moves down the blade, and does not slip sideways. Additionally, including the at least one stabilizing wheel 120 allows this firm contact to be maintained between the rotorcraft blade and the apparatus without scraping or otherwise damaging the blade or apparatus and without preventing the apparatus from easily moving down the blade.

Figure 6:
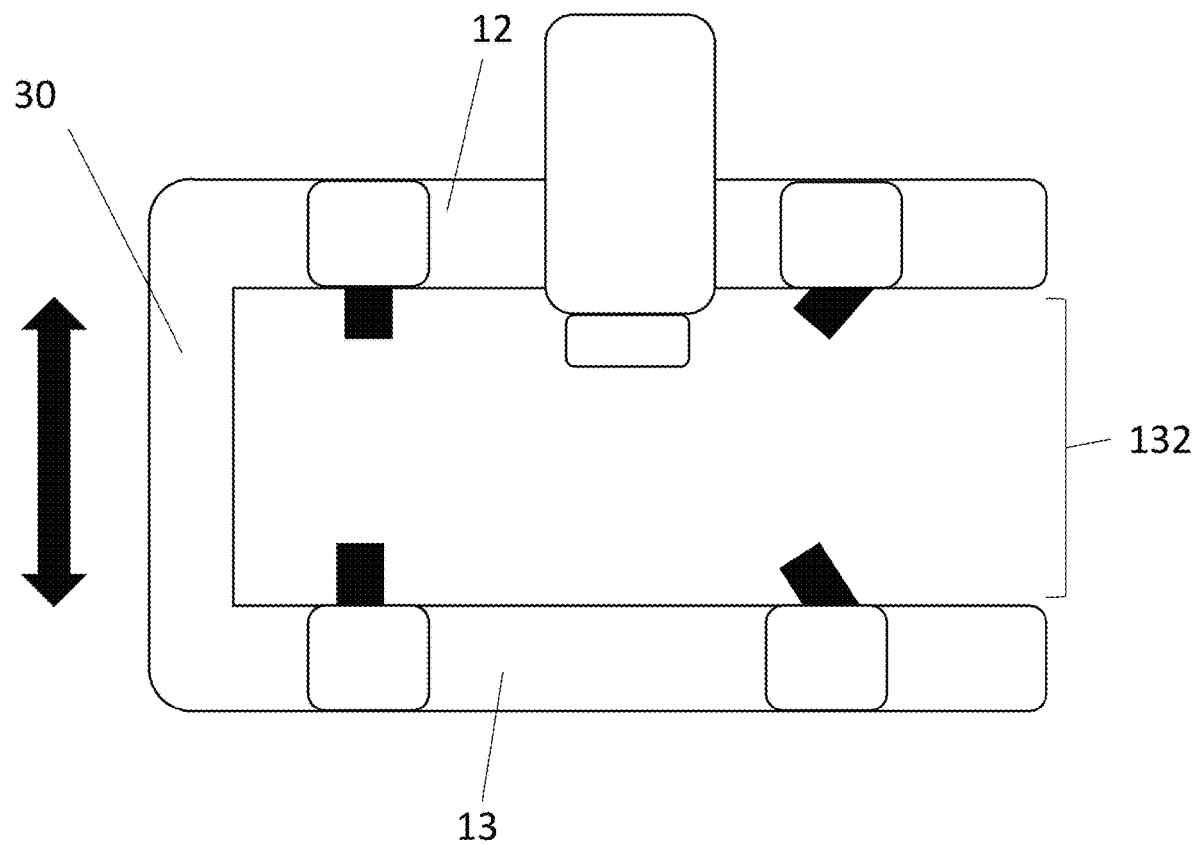
FIG. 6 illustrates a side orthogonal view of a rotorcraft blade scanning apparatus having an adjustable height according to one embodiment of the present invention.

FIG. 6 illustrates a side orthogonal view of a rotorcraft blade scanning apparatus having an adjustable height according to one embodiment of the present invention. In one embodiment, the height of the connector 30 is adjustable such that the size of the gap 132 between the first central base 12 and the second central base 13 is adjustable. This allows the apparatus to be used to scan airfoil shaped-bodies having a wider variety of thicknesses, as the height of the device is able to be adjusted to match the airfoil shaped-body.

Figure 7:
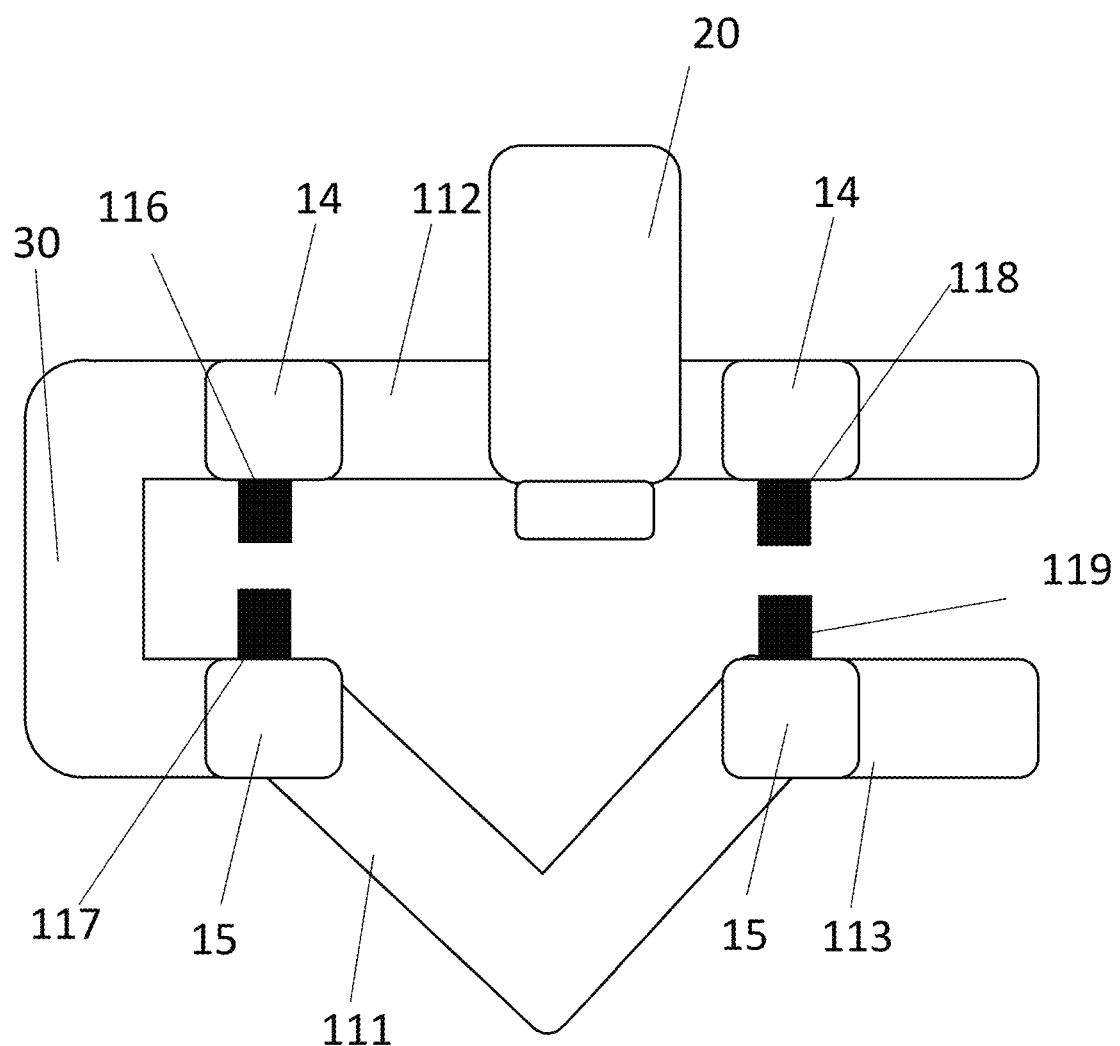
FIG. 7 illustrates a side orthogonal view of a rotorcraft blade scanning apparatus having non-parallel bases according to one embodiment of the present invention.

FIG. 7 illustrates a side orthogonal view of a rotorcraft blade scanning apparatus having non-parallel bases according to one embodiment of the present invention. In one embodiment, the full length of the first central base 112 is not substantially parallel with the full-length of the second central base 113. In one embodiment, the second central base includes a v-shaped section 111 between the wheel housings containing the plurality of wheels 117 and the plurality of wheels 119. Including non-parallel regions of the apparatus is helpful in situations in which parts hang off a section of the rotorcraft blade that would otherwise block the apparatus from moving along the rotorcraft blade. In one embodiment, each of the plurality of wheels, 116-119 remain parallel and only sections of the second central base 113 are non-parallel to the first central base 112. However, in another embodiment, the entirety of the second central base is able to be non-parallel with the entirety of the first central base. Therefore, the apparatus is able to be used to scan parts having different shapes. One of ordinary skill in the art will recognize that the apparatus shown in FIG. 7 is solely meant to be illustrative of one example of an apparatus having non-parallel central bases, and is not intended to be limiting with regard to the variety of apparatuses having non-parallel central bases.

Figure 8A:
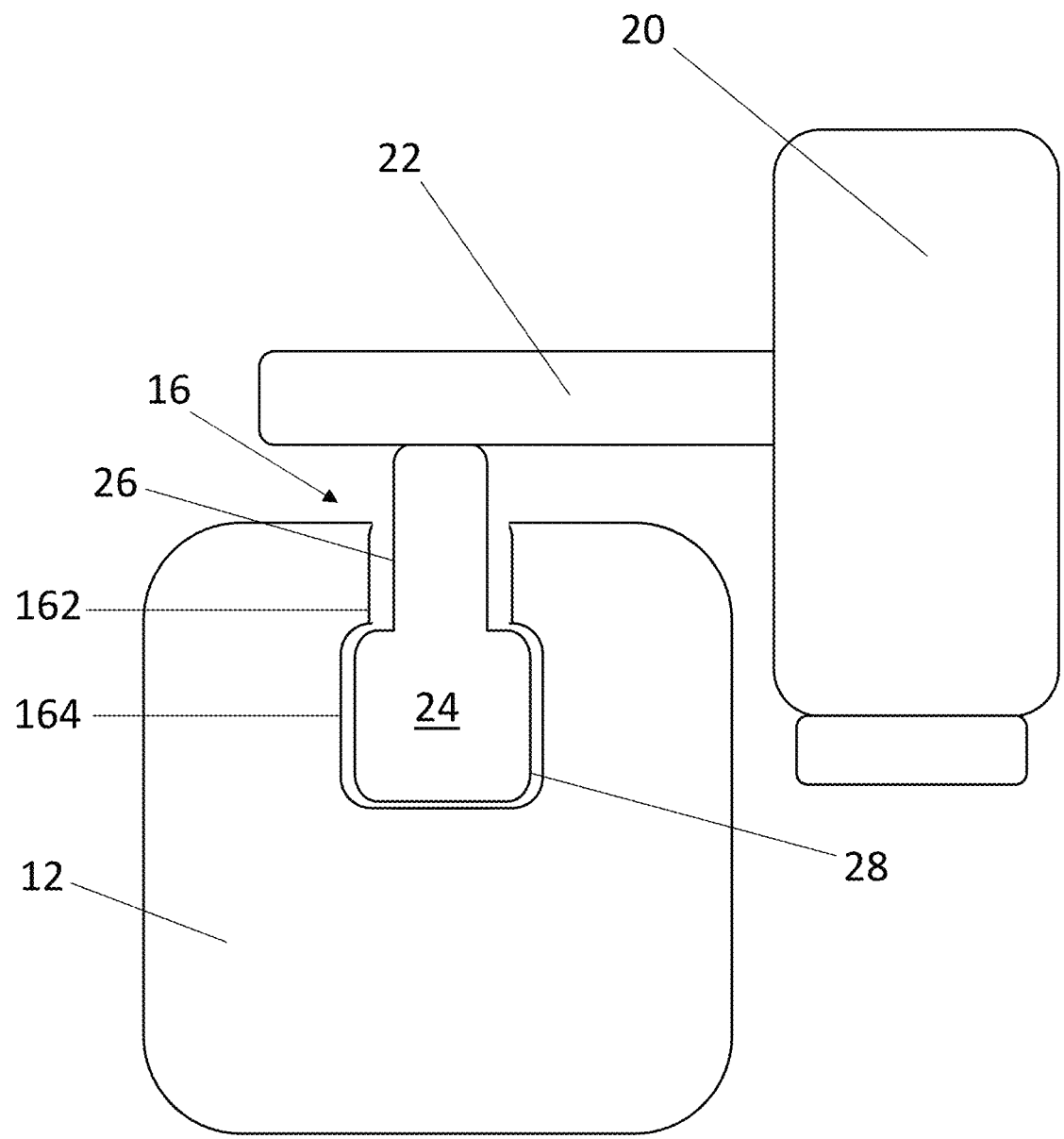
FIG. 8A illustrates a cross-section view of a translation arm fitted in a translation recess of a rotorcraft blade scanning apparatus according to one embodiment of the present invention.

FIG. 8A illustrates a cross-section view of a translation arm fitted in a translation recess of a rotorcraft blade scanning apparatus according to one embodiment of the present invention. In one embodiment, the translation arm 22 includes a peg 24 extending orthogonally outwardly from a surface of the translation arm 22. In one embodiment, the peg 24 includes a narrow stem region 26 at a proximal position relative to the translation arm 22 and a thick head region 28 at a distal position relative to the translation arm 22. Similarly, in one embodiment, the translation recess 16 includes a narrow region 162 located closer to the surface of the central base 12 and a wide region 164 positioned deeper within the central base 12 relative to the narrow region 162. In one embodiment, the thickness (or the diameter) of the thick head region 28 is greater than the thickness of the narrow region 162. Thus, the peg 24 is retained within the translation recess 16 and able to slide within the translation recess 16, such that the translation arm 22 is moved along the translation recess 16. However, in one embodiment, the thick head region 28 of the peg 24 is formed from a deformable material (e.g., rubber), such that, when forced is axially applied to the peg, the thick head region 28 is able to squeeze through the narrow region 162 of the translation recess 16, thereby allowing the peg 24 to be inserted and/or removed from the translation recess 16. In another embodiment, the thick head region 28 is not formed from a deformable material. In another embodiment, at least one portion of the translation recess 16 does not include a narrow region 162 and the thickness of the at least one portion of the translation recess 16 is uniformly larger than the thickness of the thick head region 28 of the peg 24, allowing the peg 24 to be inserted and/or removed from the translation recess 16 at the at least one portion. The detachability of the translation arm 22 from the translation recess 16 allows different sensor devices to be attached to and detached from the rotorcraft blade scanning apparatus with ease.

Figure 8B:
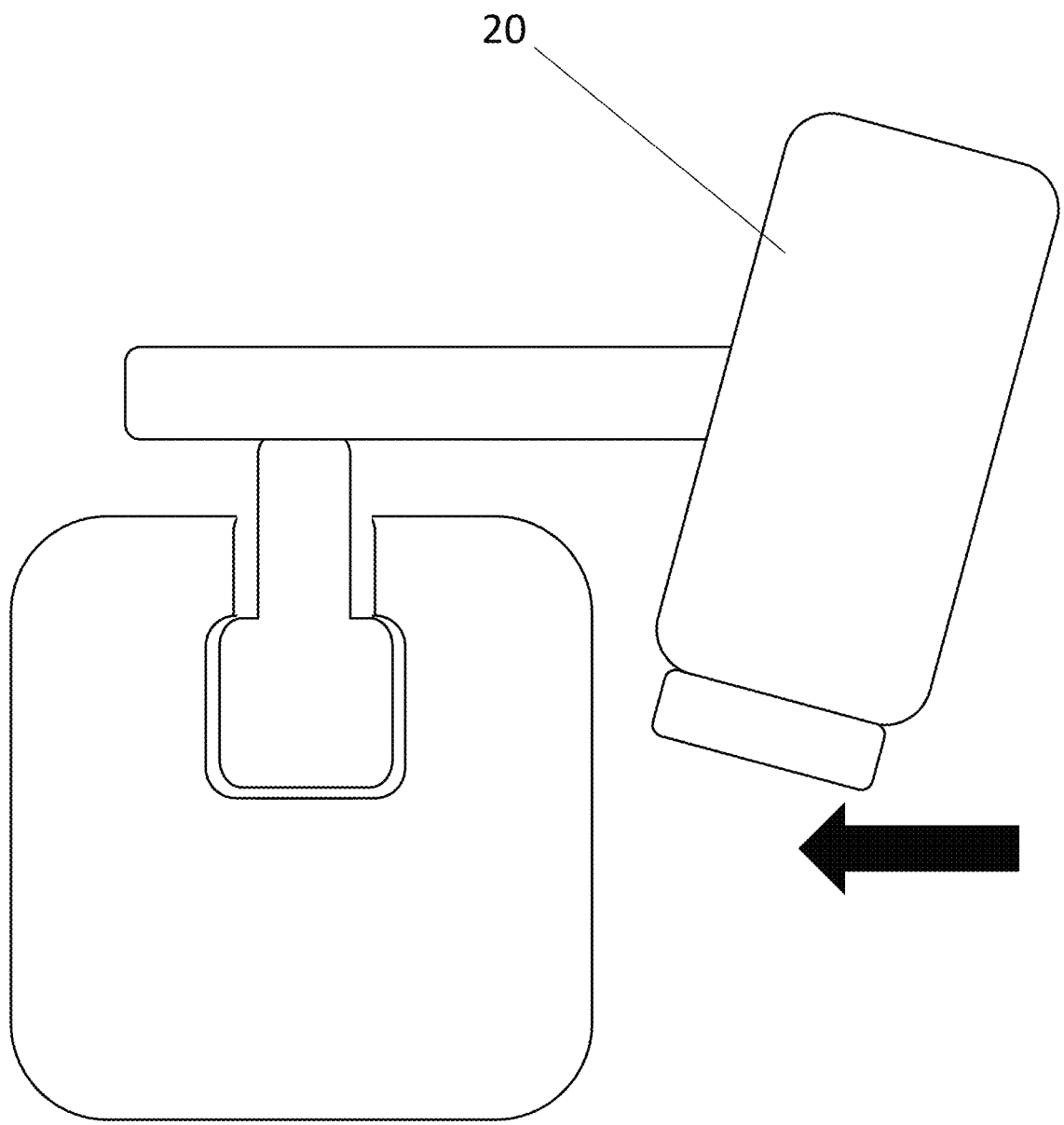
FIG. 8B illustrates a cross-section view of a translation arm fitted in a translation recess of a rotorcraft blade scanning apparatus with a sensor device tilted inwardly according to one embodiment of the present invention.

FIG. 8B illustrates a cross-section view of a translation arm fitted in a translation recess of a rotorcraft blade scanning apparatus with a sensor device tilted inwardly according to one embodiment of the present invention. As shown in FIG. 8B, in one embodiment, the sensor device 20 is operable to rotate inwardly or outwardly (i.e., toward or away from the central base 12).

One of ordinary skill in the art will understand that the present invention is not limited to apparatuses wherein the translation arm is attached to a recess in the base of the device. In another embodiment, the translation arm is mounted externally to the base and able to articulate up and down the base without interaction with a recess.

In one embodiment, the rotorcraft blade scanning apparatus is able to be used manually, able to be pushed along the rotorcraft blade, with the sensor device being manually rotatable. In another embodiment, the rotorcraft blade scanning apparatus includes at least one motor, operable to drive the wheels and move the stages, and therefore to move the rotorcraft blade scanning apparatus along a rotorcraft blade. In one embodiment, the rotorcraft blade scanning apparatus is in network communication (e.g., WI-FI, BLUETOOTH, etc.) with at least one remote device (e.g., a phone, a computer, a tablet, etc.). In one embodiment, the rotorcraft blade scanning apparatus is able to be controlled remotely from the at least one remote device. In one embodiment, a plurality of rotorcraft blade scanning apparatuses are simultaneously connected to at least one remote device and are operable to each send scan data to the at least one remote device. This is useful as it allows one rotorcraft blade scanning apparatus to be placed on each of the rotorcraft blades and therefore scan each of the rotorcraft blades at once.

In one embodiment, the sensor device includes at least one ultrasonic sensor and is able to produce scan data that is then able to be used to generate A-scans, B-scans, and C-scans of the rotorcraft blade. Methods of generating A-scans, B-scans, and C-scans capable of accurately detecting and characterization abnormalities (e.g., foreign objects, delaminations, disbonds, incomplete bonds, impact damage, in-plane wrinkles, out-of-plane wrinkles, etc.) within a test material and displays able to be generated from such scans in accordance with the present invention are found in U.S. Patent Publication No. 2021/0302377 and U.S. patent application Ser. No. 17/336,937, each of which is incorporated herein by reference in its entirety. In one embodiment, the scan data is analyzed by an artificial intelligence module (e.g., a machine learning module) operable to provide predictive analytics regarding the likelihood of failure of the rotorcraft blade as a result of one or more detected abnormalities.

In one embodiment, the rotorcraft blade scanning apparatus includes at least one encoder (e.g., an optical encoder, a magnetic encoder, etc.) operable to detect the coordinate locations of the rotorcraft blade scanning apparatus and produce translational movement data. In one embodiment, the sensor device also includes at least one rotary encoder (e.g., an optical encoder, a magnetic encoder, etc.) operable to determine an angle and/or a distance moved by the sensor device and produce rotational movement data. In one embodiment, at least one position recorded by at least one encoder and/or the at least one rotary encoder is able to be saved and stored in a memory on the rotorcraft blade scanning apparatus and/or on the at least one remote device upon receiving an input on the at least one remote device. In one embodiment, the at least one recorded position is saved and stored upon detection of a potential abnormality by at least one artificial intelligence module. This electronic marking is able to be used to supplement or replace the use of marking fluid for indicating a position to be examined further at a later time. In one embodiment, a processor within the rotorcraft blade scanning apparatus and/or the at least one remote device is operable to perform data fusion between the translational movement data, the rotational movement data, and/or the scan data in order to develop a C-scan image of the rotorcraft blade. In one embodiment, in addition to or in lieu of the at least one encoder and/or the at least one rotary encoder, the rotorcraft blade scanning apparatus utilizes a stepper motor having a known step size. Because the step size of the stepper motor is known, the distance moved by the rotorcraft blade scanning apparatus and/or the sensor device is able to be determined based on the number of steps moved. In one embodiment, based on the total area of the rotorcraft blade and the amount of area scanned by the sensor device, the rotorcraft blade scanning apparatus is operable to transmit a completion percentage and/or a yet-to-be-completed percentage to the at least one remote device.

In one embodiment, the rotorcraft blade scanning apparatus automatically moves along the rotorcraft blade until it reaches the end of the rotorcraft blade. In one embodiment, the rotorcraft blade includes at least one camera or positioning device connected to a processor operable to perform edge detection to determine when the rotorcraft blade scanning apparatus has reached the end of the rotorcraft blade, in order to prevent the rotorcraft blade scanning apparatus from running off the edge of the blade. In another embodiment, the rotorcraft blade scanning apparatus is operable to receive a length of the rotorcraft blade from the at least one remote device and automatically runs along the rotorcraft blade until it has moved a distance substantially equal to the received length measurement. In another embodiment, the rotorcraft blade scanning apparatus is used in a manufacturing workflow and the length of the rotorcraft blade is preset for each blade. Similarly, in one embodiment, the rotorcraft blade scanning apparatus is operable to automatically rotate the at least one sensor device while the rotorcraft blade scanning apparatus is moving and/or between each movement of the rotorcraft blade scanning apparatus, such that the entire width of the rotorcraft blade is scanned.

In one embodiment, the rotorcraft blade scanning apparatus is connected to at least one pulser receiver, at least one processor used to analyze the scan data, at least one input receiving device for receiving commands to operate the apparatus, and/or at least one display device via cable. In the same embodiment, much of the electronics are able to be left off the device, reducing the weight and bulkiness of the device. In another embodiment, the at least one pulser receiver, the at least one processor, the at least one input receiving device, and/or the at least one display device are directly attached to the apparatus. In one embodiment, the apparatus includes at least one wireless receiver, operable to communicate with at least one user device over a network (e.g., WI-FI, BLUETOOTH, etc.), thereby allowing the device to be operated remotely.

Figure 9:
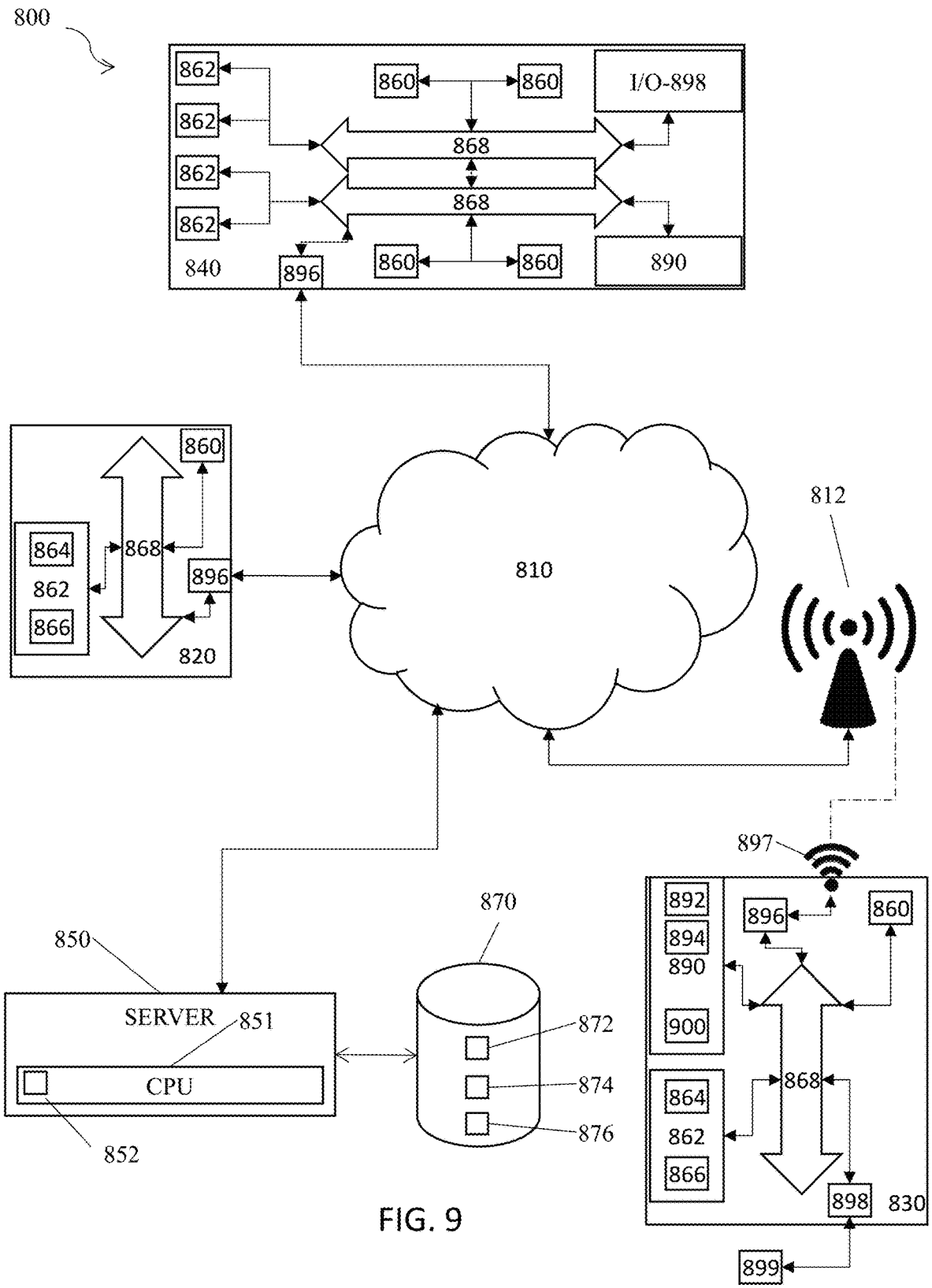
FIG. 9 is a schematic diagram of a system of the present invention.

FIG. 9 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 9, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 9, is operable to include other components that are not explicitly shown in FIG. 9, or is operable to utilize an architecture completely different than that shown in FIG. 9. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. An apparatus for non-destructively scanning rotorcraft blades, comprising:
a central base, including a top component and a bottom component bridged by and integrally formed with a connector; and
an inspection module attached to an elongate member including at least one peg;
wherein at least one bottom wheel extends from the bottom component inwardly toward the top component;
wherein at least one top wheel extends from the top component inwardly toward the bottom component;
wherein the central base defines at least one recess extending longitudinally along the central base;
wherein the at least one recess is configured to accept the at least one peg of the elongate member; and
wherein the elongate member is rotatable about the at least one peg, such that the position of the inspection module with respect to the central base is able to be adjusted.

2. The apparatus of claim 1, wherein the inspection module includes at least one ultrasonic probe, at least one ultrasonic resonance probe, at least one terahertz probe, at least one radiographic probe, at least one thermographic probe, and/or at least one eddy current probe.

3. The apparatus of claim 1, wherein the inspection module is operable to automatically move upwardly and downwardly along the elongate member.

4. The apparatus of claim 1, wherein the inspection module includes at least one fluid release mechanism operable to release marking fluid or dye proximate to an inspection area scanned by the inspection module.

5. The apparatus of claim 1, wherein the inspection module is operable to automatically pivotably tilt toward or away from the central base.

6. The apparatus of claim 1, wherein the apparatus is operable to automatically adjust a camber of the at least one top wheel and/or the at least one bottom wheel.

7. The apparatus of claim 1, wherein the at least one top wheel includes a plurality of top wheels and wherein the at least one bottom wheel includes a plurality of bottom wheels.

8. The apparatus of claim 1, wherein the top component is vertically movable with respect to the bottom component by at least one motor.

9. A system for non-destructively scanning rotorcraft blades, comprising:
a blade scanning apparatus, including:
a central base, including a top component and a bottom component bridged by and integrally formed with a connector; and
an inspection module attached to an elongate member pivotably connected with a recess of the central base; and
at least one user device in wireless communication with the inspection module;
wherein the inspection module is operable to generate scan data for a test object and transmit the scan data to the at least one user device;
wherein at least one bottom wheel extends from the bottom component inwardly toward the top component; and
wherein at least one top wheel extends from the top component inwardly toward the bottom component.

10. The system of claim 9, wherein the connector bridges a first end of the top component and a first end of the bottom component.

11. The system of claim 9, wherein the at least one user device is operable to transmit a scan routine to the blade scanning apparatus, wherein the scan routine includes a distance that the blade scanning apparatus is to travel and/or a pattern of movement or adjustment of the inspection module, and wherein the blade scanning apparatus is operable to automatically execute the scan routine.

12. The system of claim 9, wherein the blade scanning apparatus is operable to automatically adjust a camber of the at least one top wheel and/or the at least one bottom wheel.

13. The system of claim 9, wherein the inspection module includes at least one ultrasonic probe, at least one ultrasonic resonance probe, at least one terahertz probe, at least one radiographic probe, at least one thermographic probe, and/or at least one eddy current probe.

14. The system of claim 9, wherein the inspection module is operable to automatically move upwardly and downwardly along the elongate member.

15. The system of claim 9, wherein the at least one user device is in wireless communication with at least one motor driving the at least one bottom wheel and/or at least one motor driving the at least one top wheel, and wherein the at least one user device is operable to transmit commands to the blade scanning apparatus causing it to move forward or backward.

16. The system of claim 9, wherein the inspection module includes at least one fluid release mechanism operable to release marking fluid or dye proximate to an inspection area scanned by the inspection module.

17. An apparatus for non-destructively scanning rotorcraft blades, comprising:
- a central base, including a top component and a bottom component bridged by and integrally formed with a connector; and
- an inspection module attached to an elongate member pivotably connected with a recess of the central base;
- wherein the inspection module includes at least one fluid release mechanism operable to release marking fluid or dye proximate to an inspection area scanned by the inspection module;
- wherein a plurality of bottom wheels extend from the bottom component inwardly toward the top component; and
- wherein a plurality of top wheels extend from the top component inwardly toward the bottom component.

18. The apparatus of claim 17, wherein the inspection module includes at least one ultrasonic probe, at least one ultrasonic resonance probe, at least one terahertz probe, at least one radiographic probe, at least one thermographic probe, and/or at least one eddy current probe.

19. The apparatus of claim 17, wherein the apparatus is operable to receive a scan routine, wherein the scan routine includes a distance that the blade scanning apparatus is to travel and/or a pattern of movement or adjustment of the inspection module, and wherein the apparatus is operable to automatically execute the scan routine.

20. The apparatus of claim 17, wherein the inspection module is operable to automatically pivotably tilt toward or away from the central base.

* * * * *